(12) United States Patent
von Rothkirch und Panthen et al.

(10) Patent No.: US 9,050,916 B2
(45) Date of Patent: Jun. 9, 2015

(54) CENTER ARM REST HAVING A CRASH PROTECTION

(71) Applicant: F.S. Fehrer Automotive GmbH, Kitzingen (DE)

(72) Inventors: Eberhard von Rothkirch und Panthen, Sommerach (DE); Thomas Hessdorfer, Karlstadt (DE); Manfred Dehn, Kitzingen (DE)

(73) Assignee: F.S. Fehrer Automotive GmbH, Kitzingen (DE)

( * ) Notice: Subject to any disclaimer, the term of this patent is extended or adjusted under 35 U.S.C. 154(b) by 0 days.

(21) Appl. No.: 14/218,799

(22) Filed: Mar. 18, 2014

(65) Prior Publication Data

US 2014/0319868 A1   Oct. 30, 2014

(30) Foreign Application Priority Data

Apr. 30, 2013   (DE) .......................... 10 2013 207 927

(51) Int. Cl.
*B60N 2/46* (2006.01)
*B60N 2/42* (2006.01)

(52) U.S. Cl.
CPC ............ *B60N 2/4686* (2013.01); *B60N 2/4633* (2013.01); *B60N 2/43* (2013.01); *B60N 2/4613* (2013.01)

(58) Field of Classification Search
CPC ...... B60N 2/43; B60N 2/4686; B60N 2/4613; B60N 2/13
USPC .................................. 296/187.03, 153, 24.34
See application file for complete search history.

(56) References Cited

U.S. PATENT DOCUMENTS

| 2013/0111706 A1* | 5/2013 | Anderson et al. ................ 16/342 |
| 2013/0147251 A1* | 6/2013 | Charles et al. ........... 297/411.38 |

FOREIGN PATENT DOCUMENTS

| DE | 100 57 992 A1 | 6/2002 |
| DE | 10 2007 049 763 A1 | 4/2009 |
| DE | 10 2011 114 442 A1 | 3/2013 |
| DE | 10 2011 114 443 A1 | 3/2013 |

* cited by examiner

*Primary Examiner* — Pinel Romain
(74) *Attorney, Agent, or Firm* — Billion & Armitage; Benjamin C. Armitage

(57) ABSTRACT

Embodiments relate to a center arm rest for use in a vehicle having a console part which can be attached to the vehicle body, and having an arm rest which is mounted at the console part so as to be swivelable about a swivel axis between a lower use position and an upper rest position, and having an actuating element which is arranged at the arm rest for swiveling the arm rest.

15 Claims, 7 Drawing Sheets

Figure 1:
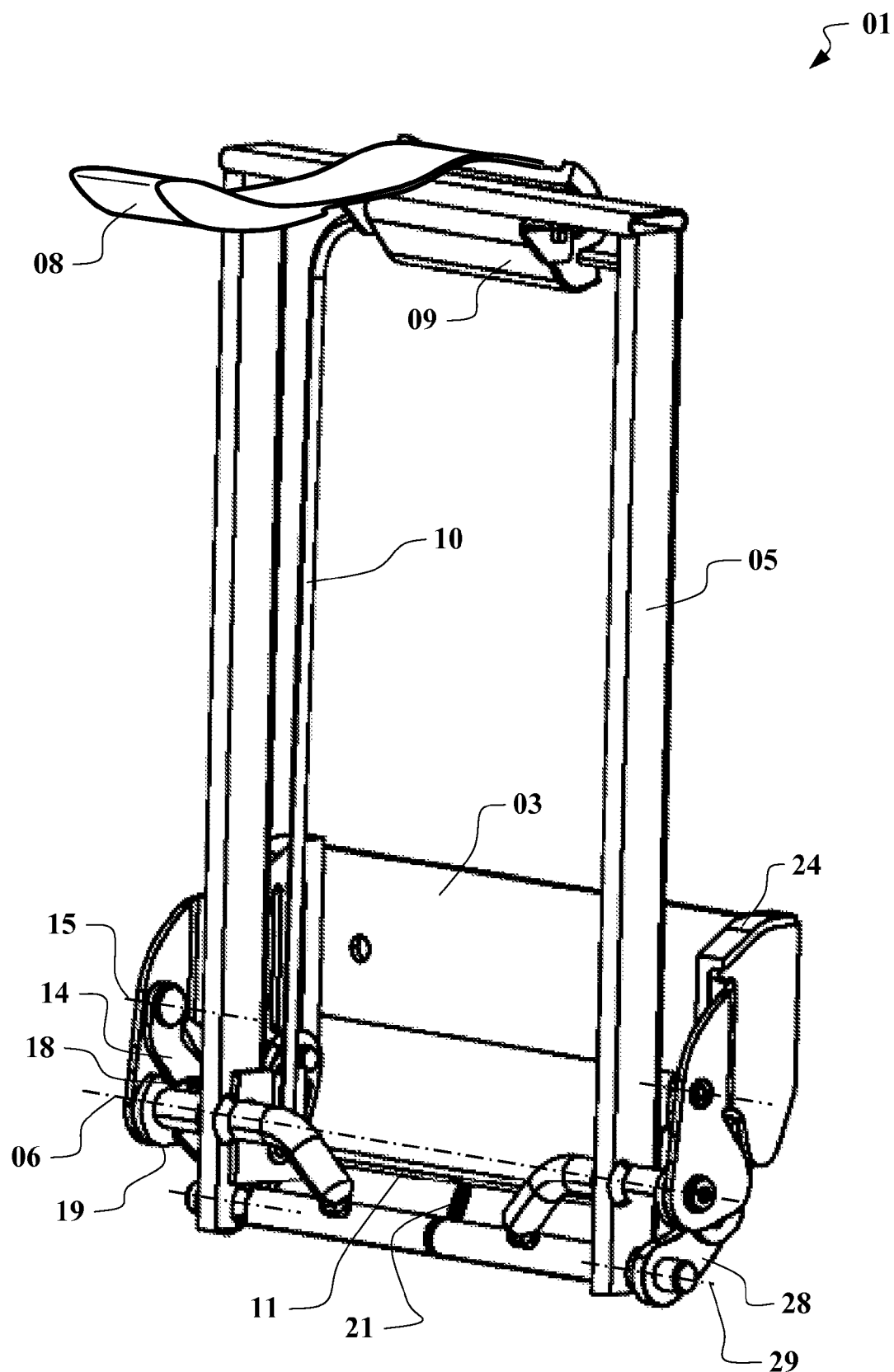

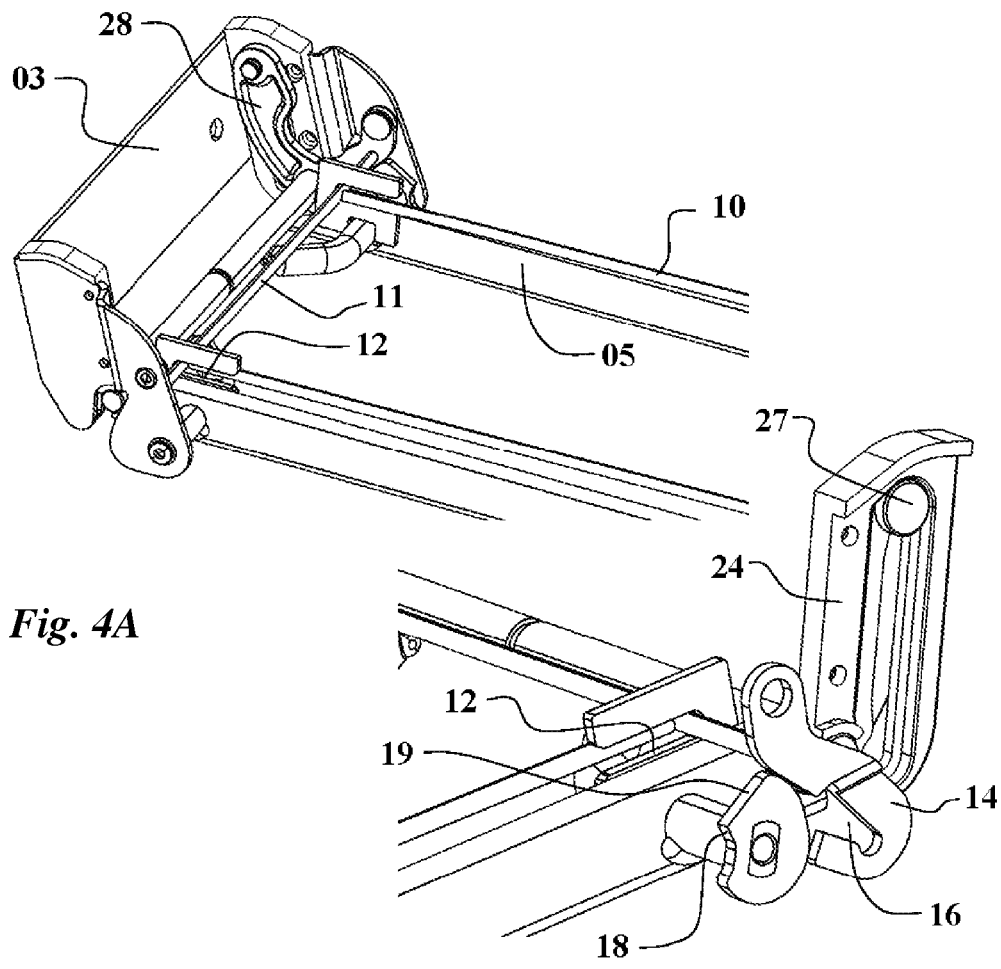
*Fig. 4A*
*Fig. 4B*
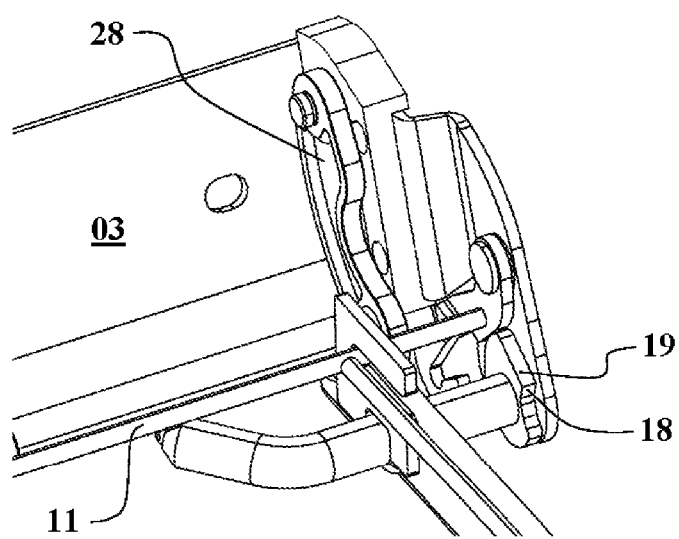
*Fig. 4C*

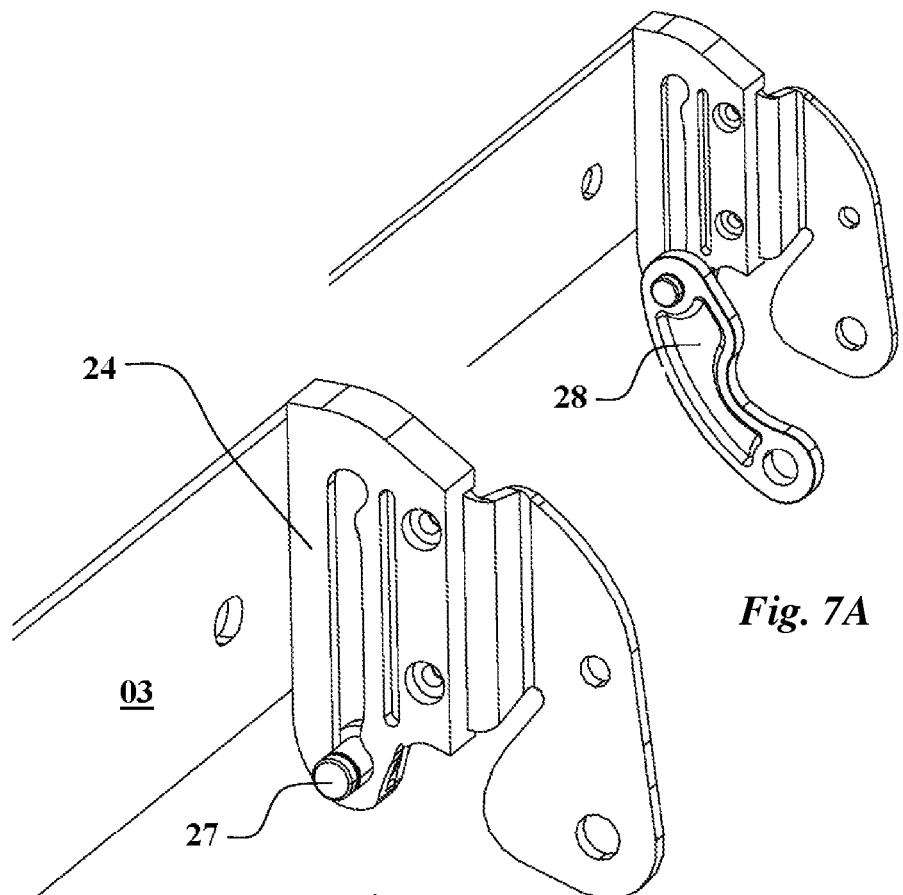
*Fig. 7A*
*Fig. 7B*
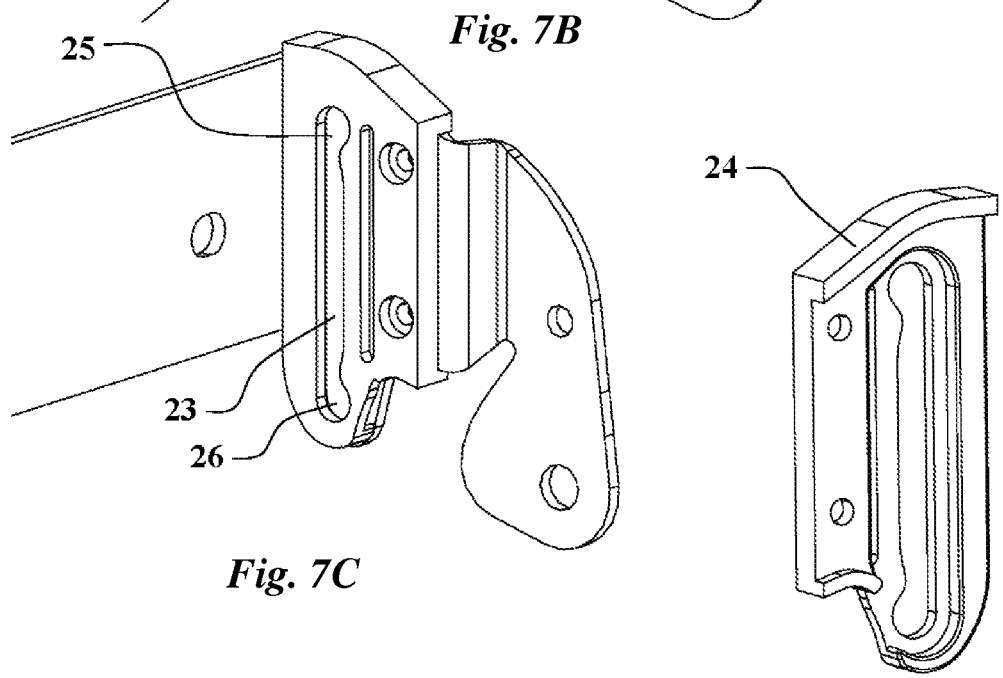
*Fig. 7C*
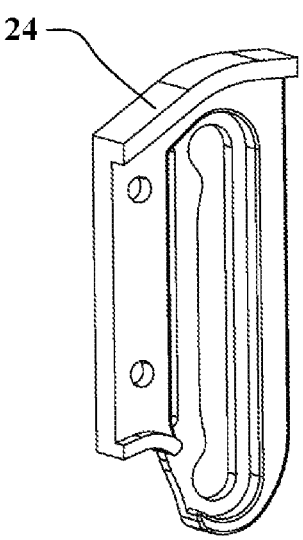
*Fig. 7D*

CENTER ARM REST HAVING A CRASH PROTECTION

The invention relates to a center arm rest for use in a vehicle having a console part and an arm rest which is mounted at the console part so as to be swivelable, wherein the arm rest can be unlocked and shifted with the aid of an actuating element, in accordance with the preamble of claim 1.

Center arm rests are known from the state of the art in a variety of types. Those center arm rests which have an arm rest that can be swiveled between a use position and a rest position are the subject here. In this case, the crash protection of the arm rest in the upper rest position is the problem. Here, it is necessary to ensure that there is no sudden forward displacement of the arm rest in the case of a crash, such that no passengers can be injured.

In order to solve this problem, different embodiments of locking mechanisms for center arm rests are known from the state of the art. In this context, document DE 10 2007 049 763 A1 discloses a simple and at the same time effective embodiment. Here, the arm rest is mounted at the console part so as to be swivelable, wherein a retaining strap is provided as an actuating element at the upper end of the arm rest in the rest position. Via deflections, said retaining strap is in turn connected to a locking element which engages into a recess in the surrounding seat structure. By pulling on the retaining strap, the locking element is firstly pulled out of the anchoring, wherein it is possible, thereafter, to fold down the arm rest by continuing to pull on the retaining strap. For avoiding adjustment problems between the locking element and the recess, documents DE 10 2011 114 442 A1 as well as DE 10 2011 114 443 A1 disclose embodiments with which locking is effected between the arm rest and the console part to be attached. Here, the actuation at the retaining strap is deflected towards a locking in the area of the swivel axis of the arm rest. By pulling on the retaining strap, a locking element is brought out of engagement against an abutment in a manner similar to the first case, wherein swiveling of the arm rest can happen in the following by continuing to pull on said retaining strap.

In the known embodiments, it is, however, in principle a disadvantage that the actuation for unlocking, that means pulling on the retaining strap, simultaneously leads to an increase in the force which is required for the actuation. Since the retaining strap is positioned at the upper end of the arm rest, a pulling force on the retaining strap leads to a torque about the swivel axis of the arm rest. Said torque is, on the one hand, absorbed by latching and/or friction forces from the mounting of the arm rest at the console part as well as by a possible retention of the arm rest in the surrounding seat structure. On the other hand, in the state of the art, the torque is, however, substantially absorbed by the locking element resting against the abutment—as long as the locking still exists—since the locking has exactly this object of preventing the swiveling movement. Obviously, this leads to a corresponding friction force when shifting the locking element with respect to the abutment, i. e. the actuation for unlocking. Consequently, the pulling movement on the retaining strap for unlocking in a negative manner suddenly leads to a friction force which is reverse to the pulling movement, raising the force required for unlocking. Said innate force increase for unlocking additionally has the consequence that—as soon as the unlocking has been effected—the swiveling movement abruptly starts due to the pulling force at the retaining strap, which is applied at an increased level.

Therefore, it is the object of the present invention to make the actuation for unlocking more comfortable and to avoid an abrupt start of the swiveling movement.

The set object is achieved by an embodiment in accordance with the invention according to the teaching of claim 1.

Advantageous embodiments are the subject-matter of the dependent claims.

First of all, a generic center arm rest serves to be used in a vehicle and for this purpose has a console part which can be directly or indirectly attached to the vehicle body. Here, the console part can both be an integral console part and also an assembly group which is stationarily installed in the vehicle in respect of the center arm rest. Here, it is irrelevant whether the installation site is, for example, a foldable back rest, thus in turn being convertible with respect to the position.

Furthermore, the center arm rest comprises an arm rest which is mounted at the console part so as to be swivelable about a swivel axis between a lower use position and an upper rest position. The embodiment of the arm rest regarding the carrier structure, the cushioning or other additional fittings or fixtures is irrelevant regarding the embodiment in accordance with the invention. The generic arm rest at least has an actuating element, by means of which a swiveling of the arm rest can be produced. Furthermore, in the rest position, the arm rest is retained in the existing rest position by friction forces and/or latching forces and/or spring forces, said forces counteracting a force applied on the actuating element for swiveling the arm rest. Said forces result as a retaining force at the actuating element.

Furthermore, the center arm rest comprises a locking device which comprises at least one locking element and a corresponding abutment as well as the actuating element. At least in the rest position of the arm rest, without an actuation at the actuating element, the locking element is situated in an engaged position, preventing a swiveling movement of the arm rest due to its position with respect to an abutment. Here, it is firstly irrelevant at which components the locking element and the abutment are arranged, wherein at least one of the elements is to be assigned to the arm rest and the other element correspondingly is to be assigned to the console part. Using the actuating element, with the arm rest in the rest position, a shifting of the locking element from the engaged position into a disengaged position can be effected, which involves an unlocking.

Correspondingly, a swiveling of the arm rest can now be effected by continuing to actuate the actuating element.

Due to the use of an actuating element both for swiveling the arm rest and for unlocking the locking element, from the present problem it necessarily results that the actuation at the actuating element can be effected in a direction for unlocking, which direction corresponds to the direction for swiveling. This means that the user can shift the actuating element in an unchanged actuating direction (which is random and is to be assumed to be usable for swiveling), here firstly producing the unlocking of the locking element and subsequently the swiveling of the arm rest.

With the usual negligence of the retaining force, this would lead to the problem, which is known from the state of the art, of the additional load on the locking device due to the initiated swiveling movement.

In accordance with the invention, the object is achieved in that an adjustment between the retaining force acting on the arm rest, and the actuating force resulting due to the structure of the locking device is effected at the actuating element, wherein the actuating force is smaller than the resulting retaining force. Here, the actuating force refers to the force at the actuating element, which is required for unlocking, that means for shifting the locking element from the engaged position into the disengaged position. This means that an actuation at the actuating element, in case of an increase in the force to be applied by the user up to the actuating force, firstly produces an unlocking of the locking element in any case before the value of the retaining force is reached when the actuation is continued, the swiveling of the arm rest subsequently being started.

Obviously, the retaining force firstly is to be identified for this purpose, which force is substantially determined by the friction forces, latching forces and/or spring forces acting in the rest position.

Starting from the embodiment of the locking device, which is firstly selected, with the actuating force for unlocking resulting herefrom, a modification of the locking device is to be made to the effect that the condition stated above is complied with. The adaptations which expediently are to be made here result without further ado, wherein the main focus is in particular on the type of the transmission of the movement of the actuating element onto the locking element.

If the retaining force still remains larger than the actuating force after the corresponding adaptation of the locking device or if the result has not turned out to be satisfactory under the aspect of ease of use, it is further to be considered whether the retaining force can advantageously be raised by increasing the latching force or, where appropriate, by increasing the friction force. The latching force should, however, only be as high as required for fulfilling the condition, so that a downward swiveling, which is as regular as possible, from the latching position is ensured.

If the embodiment initially selected cannot be changed in such a manner that the condition is complied with—which can be easily found out—, the concept has to be changed, wherein, for example, the embodiment illustrated in the figures may be selected.

By the adjustment between the actuating force and the retaining force, taking into account the embodiment of the locking device as well as the friction forces, latching forces and/or spring forces acting on the arm rest in the rest position, it is prevented for the first time that the actuation at the actuating element for unlocking simultaneously generates friction forces between the locking element and the abutment, which increase to the negative. Rather, due to the newly created embodiment, the shifting from the engaged position into the disengaged position can be effected when friction forces are constantly present within the locking device, wherein the required actuating force itself is not influenced by the actuation. As a consequence, the complete unlocking can be carried out without resulting in a notably increasing exertion of force. As a consequence, it is also prevented that the swiveling movement of the arm rest abruptly starts, as is oftentimes the case in the state of the art. Rather, the shifting of the arm rest out of the rest position is now exclusively determined by the retaining force which is composed of precisely those friction forces, latching forces and/or spring forces acting on the arm rest.

Here, it is particularly advantageous if, in the rest position of the arm rest and in the engaged position of the locking element, there is a play between the locking element and the abutment. This means that in the engaged position of the arm rest, without taking into account a load on the arm rest which is conditioned by a crash, the locking element explicitly does not rest against the abutment.

Regarding the functioning of the locking, it is firstly irrelevant here how large said play is. In the configuration, it is to be taken into account that, in case the arm rest is displaced forward due to a crash, with a larger play a correspondingly broader swiveling of the arm rest, until the locking element rests against the abutment, is permitted. If, due to the play, the swiveling movement of the arm rest, which is made possible, is limited to small angle degrees in the case of a crash, this as a rule does not lead to any safety concerns.

By the advantageous separation of the locking element and of the abutment in the engaged position due to the play between the elements, it is prevented in a particularly simple manner that—in contrast to the state of the art—an increasing friction force between the locking element and the abutment has to be overcome during the actuation.

For actuating the arm rest in a comfortable manner, it is particularly advantageous if the actuating element is arranged at the upper end of the arm rest in the rest position. Thus, on the one hand, a good accessibility is made possible, but also, on the other hand, the required force for swiveling the arm rest is advantageously influenced due to the larger torque about the swivel axis.

For producing a shifting of the locking element, in this case at least one transmitting means is required in order to transmit the actuation of the actuating element onto the locking element.

Since, as a rule, an actuating element is advantageously embodied only as a strap, thus being able to be exposed to only a pulling movement, it is furthermore advantageous if a spring force acts on a transmitting means and/or on the locking element against the direction of actuation. Thus, the locking element is shifted into the engaged position, directly or by the transmitting means, at least in the rest position of the arm rest. Thus, it is not required to shift the locking element as well as the actuating element back, but rather the locking element is automatically shifted back into the engaged position when the arm rest is swiveled back and is brought into the rest position.

A reliable functioning regarding the shifting between the engaged position and the disengaged position is made possible in that the locking element, outside of the rest position, rests against a sliding surface, whereby the locking element is retained in the disengaged position. Here, it is, however, not important that the disengaged position is a fixed position of the locking element, but rather said position is to ensure that the free swivelability of the arm rest from the use position until reaching the upper rest position is ensured without limitation and that a defined transition into the engaged position is made possible when the rest position is reached.

Regarding the shifting of the locking element, the most diverse embodiments are possible. In this context, it is not only possible to embody the locking element in a translatory and/or rotational manner so as to be shiftable between the engaged position and the disengaged position. Here, it is at least to be ensured that a defined position of the locking element in the engaged position is ensured for the support at the abutment, which is conditioned by a crash, and that there is a free swivelability of the arm rest in the disengaged position. A reliable embodiment is made possible by an embodiment of the locking element which is swivelable about a locking axis. Thus, it is possible to advantageously influence the forces required for shifting the locking element and the paths required for shifting. Furthermore, as a rule, a swivel bearing turns out to be less interference-prone than a linear bearing.

For shifting the locking element, it is furthermore particularly advantageous if a coupling element is utilized as a transmitting means, which coupling element engages into a sliding block groove of the locking element, at least in the rest position. In this case, the coupling element can, for shifting the locking element, in turn be shifted along the sliding block groove of the locking element. Here, it is irrelevant whether the coupling element is engaged with the locking element only in the rest position or whether it continues to be connected to the locking element during the swiveling movement of the arm rest. Since shifting the locking element between the disengaged position and the engaged position is required only in the rest position, the coupling element, in an advantageous embodiment as well, is preferably engaged with the locking element only in the rest position and in the starting swiveling movement of the arm rest. Here, the coupling element leaves the sliding block groove when the arm rest continues to be swiveled and is guided back into the sliding block groove when the arm rest is swiveled back into the rest position.

For advantageously securing the position of the coupling element in the arm rest, the same is advantageously mounted so as to be displaceable along a guide groove. Thus, a reliable position of the coupling element is ensured and the required installation space within the arm rest does not exceed the shifting path of the coupling element along one direction.

For effectively shifting the locking element while observing the actuating force which, in accordance with the invention, is required to be smaller than the retaining force, the locking axis and the coupling element, in terms of the engaged position, are arranged on opposite sides with respect to the abutment. Here, this in particular refers to the swivelable embodiment of the locking element. Thus, the lever length is advantageously influenced when the coupling element acts on the locking element in relation to the lever length between the locking axis and the abutment, so that actuating forces can be minimized. The opposite side does not require a precise counterpart, but instead, the lever lengths are decisive, resulting in an opposite arrangement.

Regarding the allocation of the locking element and the abutment between the swivelable arm rest and the stationary console part, it is particularly advantageous if the locking element is arranged at the console part and if the abutment is arranged at the arm rest. Due to the limited installation space in the arm rest, an allocation of a linearly displaceable coupling element to the arm rest and of the swivelable locking element to the console part is advantageous regarding the required space.

For transmitting the movement of the actuating element onto the shifting of the locking element, it is furthermore advantageous if the arm rest has a deflection lever as a transmitting means, which lever is mounted in the arm rest so as to be swivelable, wherein the deflection lever is connected to the actuating element and the locking element. Here, it is firstly irrelevant whether another transmitting means is arranged between the actuating element and the deflection lever or between the actuating element and the locking element. In this way, the deflection lever can be directly or indirectly connected to the actuating means and to the locking element. Due to the utilization of a deflection lever, it is made possible, by adjusting force and path ratios at the deflection lever, to influence, on the one hand, the desired actuating ratios at the actuating element, that means the path required for the actuation as well as the required actuating force, and to influence, on the other hand, the adjustment of the actuating force and of the retaining force. Thus, both comfort and necessity in accordance with the invention regarding the actuating force and the retaining force can be brought in line in an improved way.

For realizing defined end positions in the rest position and in the use position as well as for influencing the swiveling movement, it is in principle an advantage in a center arm rest if a console part has at least one latching groove and if the arm rest has at least one latching bolt which is arranged so as to be displaceable in the latching groove. By utilizing latching bolts in the latching groove, the end position and the swiveling movement can be influenced. Here, in an advantageous manner, the latching groove has an end stop at least for the use position. Thus, the arm rest can be supported via the latching bolt at the end stop of the latching groove when using the arm rest as such.

If, in the upper rest position, due to the fact that the arm rest is completely swiveled up, a defined end position automatically results as the rest position due to the arrangement in the vehicle, in respect of the latching groove a corresponding end stop is not required, wherein the same can, however, also be provided in this case as well. An end stop for the rest position is at least advantageous if a defined end position of the arm rest at the seat is cannot be ensured without the same.

For realizing the required retaining force, taking into account the possible actuating force at the actuating element, it is particularly advantageous if the latching groove comprises at least one latching mechanism at least for the rest position. By using a latching mechanism, latching forces are applied onto the arm rest in a targeted manner, which latching forces can define the retaining force in the desired manner. Thus, it can be ensured in a simple manner that the actuating force can be selected to be smaller than the retaining force. Here, it is, however, to be taken into account that coming out of the rest position when unlocking the locking element does not lead to the undesirable effect that the swiveling movement is abruptly started. Thus, it is required to select only such an amount of the latching forces which is required in order to ensure corresponding force ratios between the retaining force and the actuating force.

Alternatively to the previously described embodiment, having the arrangement of the latching groove at the console part and of the latching bolt at the arm rest, it is also conceivable that, instead, the latching groove is inserted at the arm rest and the latching bolt is provided at the console part.

Due to the limited space conditions in an arm rest, it is furthermore particularly advantageous if the latching bolt is arranged at a supporting rocker, wherein the supporting rocker is in turn mounted at the arm rest so as to be swivelable in a rocker axis. By transmitting the movement of the arm rest onto the latching bolt via the supporting rocker, the limited installation space conditions can advantageously be used to the effect that the lever arm about the swivel axis, when the arm rest is supported at the latching bolt in the end position of the latching groove, is in particular enlarged in the use position by utilizing the supporting rocker. Here, a lever arm which is as large as possible is required since, in this position, it is required to absorb the supporting forces acting on the arm rest when the arm comes to rest thereon. On the contrary, in the rest position there are, at the most, small forces since the arm rest is usually incorporated into the surrounding vehicle structure, that means, as a rule, into the surrounding back seat bench, which means that forces acting on the arm rest only play a minor role in the rest position in respect of the latching bolt as an end stop.

For this purpose, it is particularly advantageous if, in the rest position of the arm rest, the rocker axis of the supporting rocker is arranged below the swivel axis, wherein the latching bolt is situated above the swivel axis. Due to said arrangement of the supporting rocker, in the rest position a particularly small installation space is required, whereas, when swiveling the arm rest into the use position, an enlargement of the lever arm for supporting the arm rest by means of latching bolts at the end stop of the latching groove is produced.

When looking at the advantageous embodiment of the latching device and when utilizing a corresponding supporting rocker for supporting the arm rest in particular in the use position, it is furthermore particularly advantageous if, in the engaged position of the locking element, that means also in the rest position of the arm rest, the rocker axis and the swivel axis are situated on the opposite side in respect of the coupling element. Again, a precisely opposite arrangement is not required, but rather a normal through the coupling element intersects a connecting line between the rocker axis and the swivel axis.

For this purpose, it is furthermore particularly advantageous if the coupling element, in a corresponding engaged position, is situated in front of the supporting rocker at a small distance. By mounting the coupling element in the arm rest and supporting the supporting rocker by means of latching bolts at the console part and mounting the supporting rocker in the rocker axis below the coupling element, the coupling element, in this arrangement in front of the supporting rocker, ensures an additional protection against an undesired forward displacement of the arm rest out of the rest position. Assuming that the locking element is not, as envisaged, situated in the engaged position, a forward displacement of the arm rest, which is impermissible—even though the same occurs on a larger scale than in the locked position—would, nonetheless, be prevented in this case.

A case of a crash—if the locking element is disengaged—leads to the start of a forward swiveling movement of the arm rest, wherein, as a consequence, the coupling element, which is mounted below the swivel axis in the arm rest, suddenly comes to rest against the supporting rocker. A continued movement of the supporting rocker, which is mounted via the rocker axis at the arm rest, is, however, prevented by a support of the latching bolt, which is attached to the supporting rocker, in the latching groove at the console part.

This advantageous emergency protection is particularly required with a swivelable arrangement of the locking element on a locking axis which is located above the abutment. In the case of strong vibrations or on a bad road, the locking element could be deflected, wherein the acceleration acting on the locking element is to be directed in/against the vehicle direction here. On the contrary, shifting the coupling element so that the emergency protection is omitted requires an acceleration of the coupling element in a vertical direction. From this it is derived that, if the locking element is unexpectedly moved out of the engaged position due to vibrations, a shifting of the coupling element cannot be effected.

It goes without saying that, apart from a unilateral arrangement of a locking device and/or support, the person skilled in the art will select, in an advantageous manner, a bilateral locking as well as a bilateral support between the arm rest and the console part. Advantageously, as a rule, there is a beneficial effect on the constructive effort as well as on the costs for production if a mirror-symmetric arrangement is selected. Here, amongst others, for the latching bolts and the supporting rockers, common parts can be utilized.

In the following figures, an exemplary embodiment of a center arm rest in accordance with the invention is illustrated.

Figure 2A:
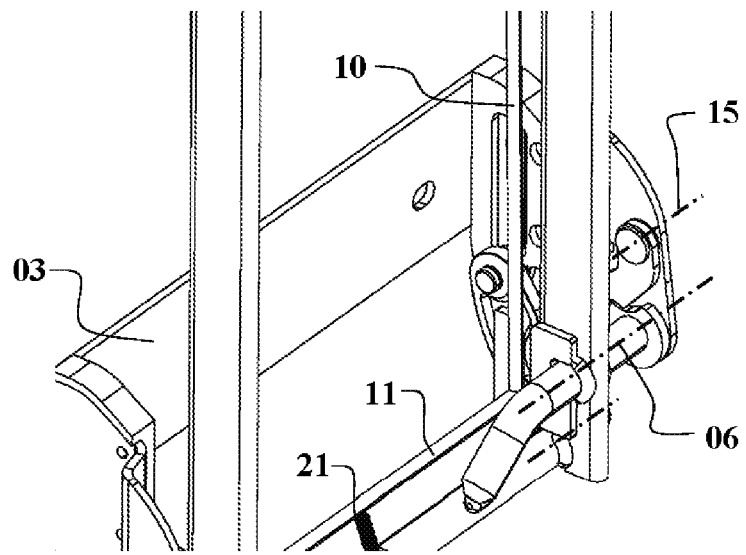
Figure 2B:
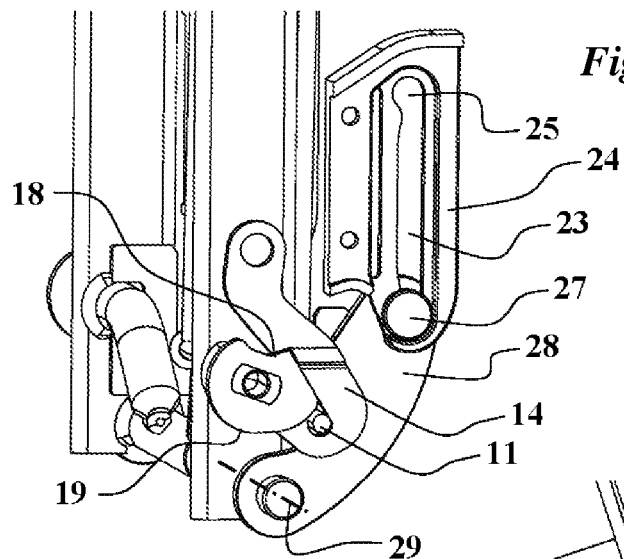
Figure 2C:
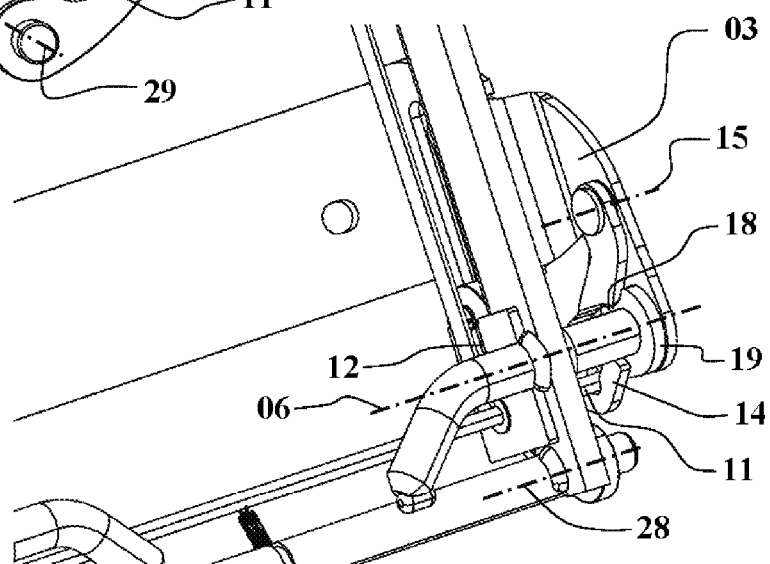
Figure 3A:
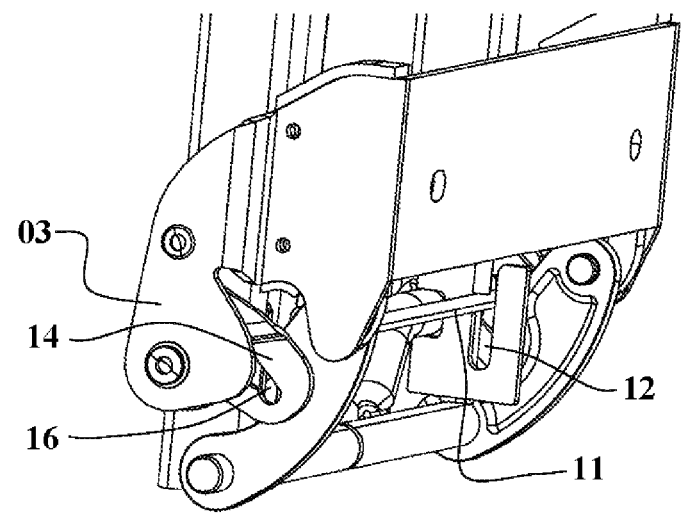
Figure 3B:
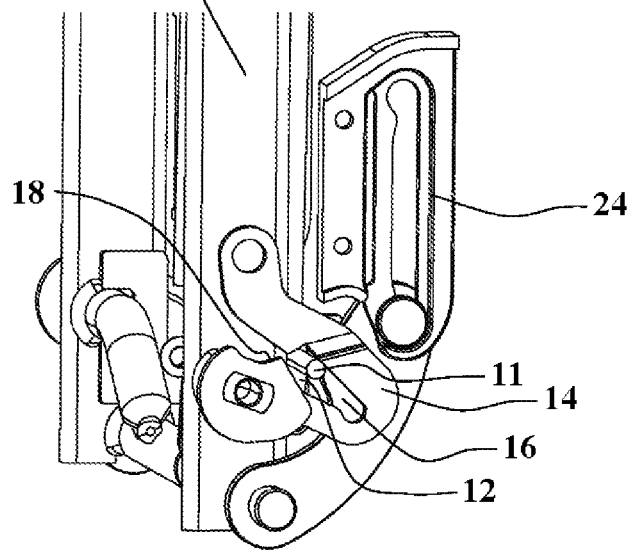
Figure 3C:
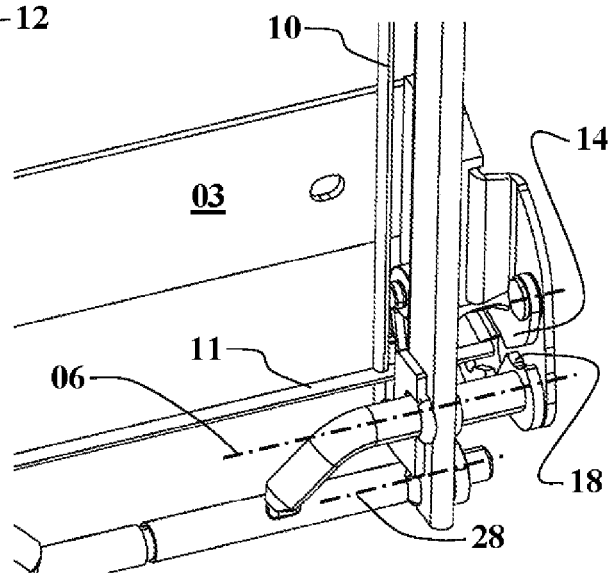
Figure 5A:
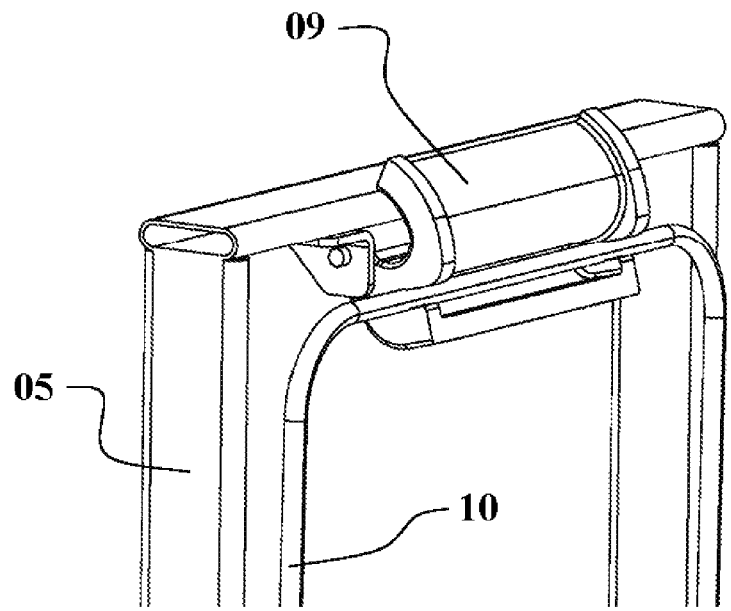
Figure 5B:
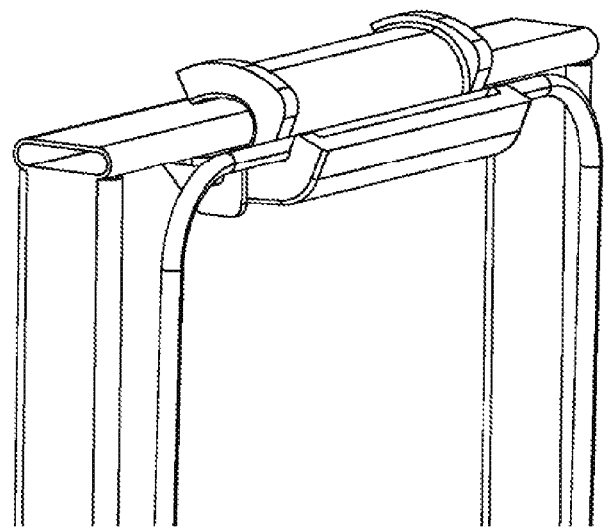
Figure 6A:
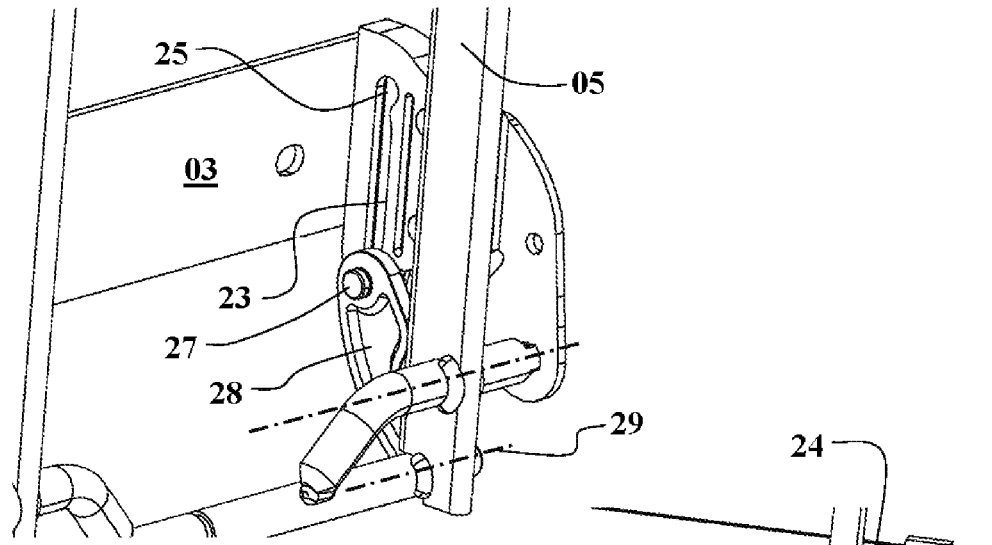
Figure 6B:
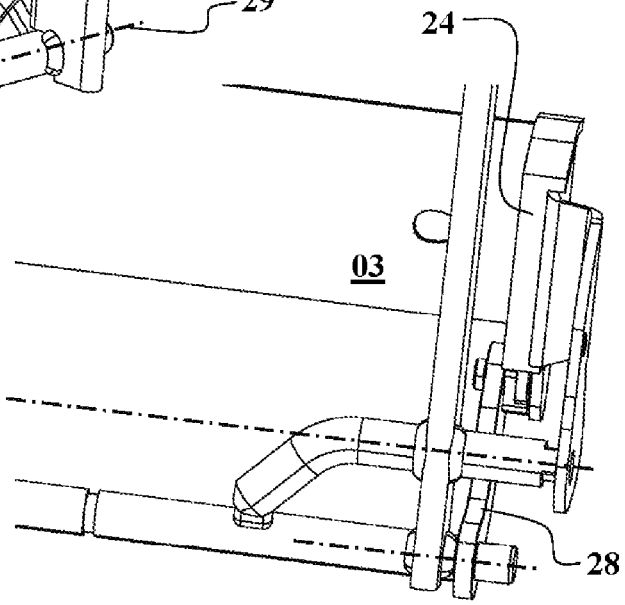
Figure 6C:
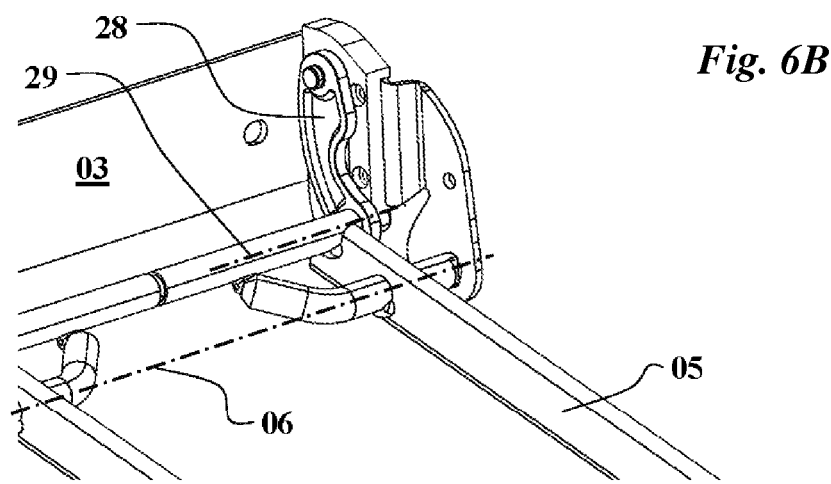

In the figures:

FIG. 1 shows the center arm rest having the console part and the arm rest, wherein, however, the illustration of the arm rest carrier part as well as of the cushioning has been omitted;

FIGS. 2A-C show detail views with respect to FIG. 1 in the area of the swivel axis as well as of the locking in the rest position as well as in the engaged position;

FIGS. 3A-C show views analogous to FIGS. 2A-C—in the rest position with the disengaged position;

FIGS. 4A-C show views analogous to FIGS. 2A-C in the use position;

FIGS. 5A-B show detail views with respect to the deflection element of the locking device;

FIGS. 6A-C show detail views in the area of the swivel axis in respect of the support by means of the supporting rocker;

FIGS. 7A-D show, additionally to FIGS. 6A-C, individual views of the support.

In FIG. 1, an exemplary embodiment of a center arm rest 01 in accordance with the invention is illustrated. For a better understanding, the illustration of a carrier part which belongs to the arm rest, as well as of the cushioning of the arm rest and possible fixtures in the arm rest has been omitted here—as in the following figures, too. For the person skilled in the art, possible designs of the arm rest regarding the carrier structure and the cushioning result in an obvious manner from embodiments known from the state of the art and do not play any further role when looking at the embodiment in accordance with the invention.

The center arm rest 01 is formed by the console part 03 as well as by the arm rest which is mounted at the console part 03 so as to be swivelable. For use, the console part 03 can be directly or indirectly attached to the vehicle structure. As a rule, a connection to the carrying structure of the surrounding back rest is effected. The console part 03 in this embodiment at least has a rear screw-on surface as well as bilateral lugs which enable mounting, supporting as well as locking the arm rest. In this respect, the swivel axis 06 can be seen, on which the arm rest is mounted with the arm rest carrier frame 05. Correspondingly, the arm rest can be swiveled about the swivel axis 06 between the upper rest position of the arm rest, which is illustrated in FIG. 1, and a lower use position.

In this embodiment, supporting the arm rest is effected using a supporting rocker 28 which is mounted at the arm rest on the rocker axis 29. Said rocker 28 engages into a latching groove 23 at the console part 03 via a latching bolt 27. Here, the latching groove 23 is inserted both in the lugs of the console part 03, which are formed of metal in the exemplary embodiment, and in the latching superstructure 24 belonging thereto.

Locking the arm rest in the illustrated rest position is effected by using a locking element 14, which element 14 is supported against an abutment 18 in the case of a crash. Here, the locking element 14 is mounted on a locking axis 15 so as to be swivelable at the console part 03 whereas the abutment 18 is connected to the arm rest carrier frame 05 in a torque-proof manner. Shifting the locking element 14 from the illustrated engaged position into a disengaged position for making it possible to shift the arm rest is effected by means of the actuating element 08 which is fastened on the top side of the arm rest. By means of the deflection lever 09, the pulling movement thereof is transmitted onto a pulling movement at the pulling bar 10, which bar 10 engages into the locking element 14 via a coupling element 11. Shifting the coupling element 11, together with the pulling bar 10, the deflection lever 09 and the actuating element 08, as well as the locking element 14 back into the engaged position as well as remaining in the engaged position is realized by means of the spring element 21, which element 21 is inserted in the arm rest between a component which is arranged at the arm rest carrier frame 05 and the coupling bar 11. Thus, in an obvious manner, shifting the locking element 14 back into the engaged position does not require any actuation at the actuating element 08. This is not desired or possible, either, since the actuating element 08 as a rule is an unstable retaining strap, by means of which it is thus possible to exclusively transmit a pulling force.

For illustrating the locking device, in FIGS. 2a and 2b, detailed views from different perspectives of the center arm rest 01 are illustrated in the area of the swivel axis 06 or of the locking element 14. What can again be seen is the mounting of the arm rest or of the arm rest carrier frame 05 on the swivel axis 06 at the console part 03. The abutment 18 is rigidly allocated to the arm rest carrier frame 05, which abutment 18 rotates with the latter in this way when the arm rest is swiveled. The locking element 14 is situated in the illustrated engaged position, being arranged so as to be opposite the abutment 18.

Even though it cannot be directly seen in the figures, in the particularly advantageous embodiment there is a gap between the abutment 18 and the locking element 14, so that shifting the locking element 14 can be effected without any friction forces between the abutment 18 and the locking element 14. For this purpose, the coupling element 11 engages into a sliding block groove 16 of the locking element 14. The locking element 14 is in turn mounted on the locking axis 15 at the console part 03 so as to be swivelable. (For a better understanding, in FIG. 2b, the illustration of the console part 03 has been omitted.) By pulling on the actuating element 08, shifting the coupling element 11 in a guide groove 12 is effected, which groove 12 is arranged at the arm rest carrier frame 05, wherein a swiveling of the locking element 14 starts due to the resulting movement of the coupling element 11 in the sliding block groove 16. Due to this particularly advantageous design and arrangement, particularly small actuating forces are required at the actuating element 08 for shifting the locking element 14. This is moreover promoted by the advantageous arrangement, which is selected in this exemplary embodiment, of the coupling element 11 in the engaged position below the abutment 18 when arranging the locking axis 15 above the abutment 18, whereby an advantageous lever arm for shifting the locking element 14 is achieved.

Moreover, in particular in FIG. 2b, the support of the arm rest via the supporting rocker 28 by means of latching bolts 27 in the latching groove 23 or the upper end stop 25 and the lower end stop 26 with the console part 03 can be seen, wherein the following FIGS. 6 and 7 go into this in more detail.

At least, another particular advantage of the selected embodiment becomes clear from this view. As it can be seen, in the rest position of the arm rest and in the engaged position of the locking element 14 (resulting from the guiding of the coupling element 11 in the guide groove 12), the coupling element 11 is situated between the arm rest carrier frame 05 and the supporting rocker 28, wherein it is relevant that the coupling element 11 is situated below the swivel axis 06, but above the rocker axis 29. Assuming the improbable case that the locking element 14 would not functionally return into its engaged position, in the case of a crash, an impermissible forward swiveling of the arm rest would nonetheless be prevented,—even though the same would have to be expected on a larger scale than when locking is effecting by means of the locking element. In the case of a swiveling of the arm rest about the swivel axis 06, the swiveling being conditioned by a crash, both the coupling element 11 and the rocker axis 29 are moved to the rear in the opposite direction. Here, after a short path, the coupling element 11 suddenly comes to rest against the supporting rocker 28, wherein the supporting rocker 28 is in turn supported in the latching groove 23 by means of the latching bolt 27, thus preventing a continued swiveling of the arm rest. Due to the different movement directions for shifting the locking element 14 and the coupling element, that means the movement of the locking element 14 against the direction of travel and of the coupling element in the vertical direction, it is moreover advantageously ensured that, in the case of strong vibrations and corresponding acceleration forces acting on the locking element 14 and the coupling element 11, both elements cannot be simultaneously shifted. Here, it is irrelevant whether, in this case of a quasi-emergency protection, components of the center arm rest suffer deformations or damage when the intended locking by the locking element 14 fails, as long as considerable injury to persons is prevented.

In FIGS. 3a and 3b, additionally to the detail views of FIG. 2, the disengaged position of the locking element 14 is now illustrated in the rest position of the arm rest, after the actuation at the actuating element 08. In particular the displacement of the coupling element 11 in the guide groove 12 can be seen—see FIG. 3a. This involves a displacement of the coupling element 11 along the sliding block groove 16 of the locking element 14—see FIG. 3b. Now, the arm rest can be swiveled freely without the locking element 14 being blocked at the abutment 18.

The center arm rest 01 having the arm rest in the use position is illustrated in detail views in FIGS. 4a and 4b. On the one hand, from the figures it can be seen that the coupling element 11, upon returning, is situated at the lower end of the guide groove 12 in this position, which is caused by the spring element 21 provided between the coupling element 11 and the arm rest carrier frame 05. Simultaneously, it becomes clear that, due to the locking element 14 being assigned to the console part 03 and the abutment 18 being arranged with respect to the arm rest carrier frame 05, the coupling element 11 is guided out of the sliding block groove 16 of the locking element 14. For preventing the locking element 14 from being shifted back into an engaged position, thus for ensuring that the coupling element 11 can be guided back into the sliding block groove 16 when the arm rest is swiveled back from the illustrated use position into the rest position, which is illustrated in previous views, the locking element 14 is supported at a sliding surface 19 following the abutment 18.

In addition, in contrast to previous figures, the support of the arm rest by means of the supporting rocker 28 in the use position can now be seen, with which the latching bolt 27 rests against the upper end stop 25 of the latching groove 23. In this respect, it is also referred to the following FIGS. 6 and 7.

For the calibration between the resulting retaining force acting on the actuating element 08, which is in particular provided due to the latching, and the necessary actuating force for shifting the locking element 14 from the engaged position into the disengaged position, in this example an advantageous deflection element 09 is used, whereby an adjustment of the movement path for shifting the coupling element 11 together with the locking element 14 with the forces transmitted from the coupling element 11 onto the locking element 14 can be effected, which involves an adjustment between the actuating path and the actuating force. Moreover, due to this solution, the friction forces for shifting the locking element 14, which occur in the entire locking mechanism, are reduced when pulling on the actuating element 08, since during actuation, the pulling force is mainly aligned horizontally with respect to the arm rest which is situated in the vertical upper rest position, whereas the unlocking of the locking element 14 mainly requires a movement of the coupling element 11 in the vertical direction.

FIGS. 6 as well as 7 illustrate the functional principle of supporting the arm rest, which is selected in the exemplary case, wherein, for a better understanding, the illustration of the locking mechanism has been omitted. In FIG. 6a, the rest position of the arm rest is illustrated, wherein the latching bolt 27, which bolt 27 is arranged at the supporting rocker 28, is situated in a lower latching position at the lower end stop 26 of the latching groove 23. Consequently, a continued backward swiveling of the arm rest is prevented by the end stop 26 by means of latching bolts 27. Here, the utilized supporting rocker 28 is mounted at the arm rest carrier frame 05 so as to be swivelable in the rocker axis 29. The fact that, in this constellation, there is only a small lever arm for the support in respect of the swivel axis 06 is unproblematic, since the arm rest, as a rule, can additionally be supported in the surrounding back rest part and the forces occurring here are smaller than in the use position.

Said use position can now be seen in FIG. 6c, in which the arm rest carrier frame 05 extends mostly horizontally. The latching bolt 27, which is affixed to the rocker axis 29, is, however, situated at the upper end stop 25 of the latching groove 23 now and is also latched there. Due to this displacement of the latching bolt 27 along the latching groove 23 of the console part 03, the lever arm is significantly enlarged for supporting the arm rest. Thus, the arm rest can be supported in a better way. Moreover, in this constellation it is advantageous that the latching groove 23 is situated close to the rear retaining area of the console part 03, whereby a transmission of the supporting forces onto the vehicle structure close to the attachment is made possible. At the same time this reduces the necessity for stiffening the console part 03 for transmitting the occurring forces.

With the selected support of the arm rest via the supporting rocker 28, another advantage is achieved. By guiding the latching bolt 27 in the latching groove 23, targeted latching positions with the upper end stop 25 and the lower end stop 26 can be introduced. For the realization in this exemplary embodiment, a latching superstructure 24 is selected, which superstructure 24 reduces the clear width of the latching groove 23 with the end stops 25, 26 by thickenings. Consequently, the latching forces, in particular for shifting the arm rest from the upper rest position, that means shifting the latching bolt 27 from the position at the upper end stop 26, can be defined in an advantageous manner, which in turn promotes the design of the locking device regarding the essential feature in accordance with the invention, namely the fact that the actuating force has to be smaller than the retaining force.

The invention claimed is:

1. A center arm rest for use in a vehicle comprising:
a console part directly or indirectly attached to the vehicle body;
an arm rest mounted at the console part so as to be swivelable about a swivel axis between a lower use position and an upper rest position, and
an actuating element which is arranged at the arm rest for swiveling the arm rest;
wherein the arm rest is retained in the rest position by one or more of friction forces, latching forces, and spring forces, resulting as a retaining force at the actuating element, and including a locking device comprising at least one locking element, an abutment and the actuating element, wherein the arm rest, in the rest position, can be locked by the locking element in an engaged position against the abutment so as to prevent a swiveling movement, and wherein the locking element can be unlocked by the actuating element into a disengaged position, wherein the locking device is configured such that the actuating force on the actuating element for unlocking is smaller than the retaining force.

2. The center arm rest according to claim 1, wherein in the rest position of the arm rest and in the engaged position of the locking element, there is a play between the locking element and the abutment.

3. The center arm rest according to claim 1, wherein the actuating element is arranged at the upper end of the arm rest in the rest position and at least one transmitting means transmits the actuation of the actuating element onto the locking element.

4. The center arm rest according to claim 1, wherein a spring force acts on a transmitting means and/or on the locking element against the actuating direction, in the rest position shifting the locking element into the engaged position.

5. The center arm rest according to claim 4, wherein the locking element, outside of the rest position, rests against a sliding surface, whereby the locking element is retained in the disengaged position.

6. The center arm rest according to claim 1, wherein the locking element is mounted so as to be swivelable about a locking axis.

7. The center arm rest according to claim 1, wherein a coupling element, as a transmitting means, engages into a sliding block groove of the locking element, at least in the rest position, wherein in particular the coupling element is mounted so as to be displaceable along a guide groove.

8. The center arm rest according to claim 7, wherein in the engaged position, the locking axis and the coupling element are situated on opposite sides in respect of the abutment.

9. The center arm rest according to claim 1, wherein the locking element is arranged at the console part and the abutment is arranged at the arm rest.

10. The center arm rest according to claim 1, wherein a deflection lever is configured as a transmitting means, wherein the lever is mounted in the arm rest so as to be swivelable, and to which the actuating element and the locking element are directly or indirectly connected.

11. The center arm rest according to claim 1, wherein the console part has at least one latching groove and the arm rest has at least one latching bolt which is arranged so as to be displaceable in the latching groove, wherein the latching groove forms an end stop at least for the use position and comprises a latching mechanism at least for the rest position.

12. The center arm rest according to claim 11, wherein the latching bolt is arranged at a supporting rocker, wherein the supporting rocker is mounted at the arm rest so as to be swivelable in a rocker axis.

13. The center arm rest according to claim 12, wherein in the rest position, the rocker axis is arranged below the swivel axis and the latching bolt is arranged above said axis.

14. The center arm rest according to claim 12, wherein in the engaged position, the rocker axis and the swivel axis are situated on opposite sides in respect of the coupling element.

15. The center arm rest according to claim 14, wherein the coupling element, in the engaged position, is situated at a small distance in front of the supporting rocker.

* * * * *